United States Patent
Busser (10) Patent No.: US 9,438,427 B2
(45) Date of Patent: Sep. 6, 2016

(54) METHOD AND SYSTEM FOR PROVIDING A PLURALITY OF TAMPERPROOF DIGITAL CERTIFICATES FOR A PLURALITY OF PUBLIC KEYS OF A DEVICE

(71) Applicant: Siemens Aktiengesellschaft, Munich (DE)

(72) Inventor: Jens-Uwe Busser, Neubiberg (DE)

(73) Assignee: Siemens Aktiengesellschaft, Munich (DE)

( * ) Notice: Subject to any disclaimer, the term of this patent is extended or adjusted under 35 U.S.C. 154(b) by 140 days.

(21) Appl. No.: 14/515,777

(22) Filed: Oct. 16, 2014

(65) Prior Publication Data

US 2015/0113267 A1 Apr. 23, 2015

(30) Foreign Application Priority Data

Oct. 17, 2013 (DE) .......................... 10 2013 221 159

(51) Int. Cl.
| | |
|---|---|
| *G06F 21/00* | (2013.01) |
| *H04L 29/06* | (2006.01) |
| *H04L 9/32* | (2006.01) |
| *H04L 9/30* | (2006.01) |
| *G06F 21/64* | (2013.01) |

(52) U.S. Cl.
CPC ............. *H04L 9/3247* (2013.01); *G06F 21/64* (2013.01); *H04L 9/30* (2013.01); *H04L 9/3263* (2013.01); *H04L 63/0823* (2013.01)

(58) Field of Classification Search
CPC ..... H04L 9/3247; H04L 9/3263; H04L 9/30; H04L 63/0823; G06F 21/64
See application file for complete search history.

(56) References Cited

U.S. PATENT DOCUMENTS

| | | | | |
|---|---|---|---|---|
| 8,214,638 B1 * | 7/2012 | Karp | ..................... | H04L 9/0825 380/285 |
| 9,021,255 B1 * | 4/2015 | Aharoni | .................. | H04L 29/06 713/155 |

(Continued)

FOREIGN PATENT DOCUMENTS

| | | | | |
|---|---|---|---|---|
| EP | 1 881 665 | | 1/2008 | |
| IL | WO 2013133840 A1 * | | 9/2013 | ........... H04L 9/3268 |
| WO | WO 2012/016859 | | 2/2012 | |

OTHER PUBLICATIONS

Mary R. Thompson, Abdelilah Essiari, Srilekha Mudumbai; "Certificate-based authorization policy in a PKI environment"; ACM Transactions on Information and System Security (TISSEC): vol. 6 Issue 4, Nov. 2003; Publisher: ACM; pp. 566-588.*

(Continued)

*Primary Examiner* — Andrew Nalven
*Assistant Examiner* — Courtney Fields
(74) *Attorney, Agent, or Firm* — Cozen O'Connor (57) ABSTRACT

A method and system for providing a plurality of tamperproof digital certificates for a plurality of public keys of a device by a certification authority wherein a respective signing request for requesting a digital certificate is initially created for each of a plurality of public keys, where the signing request for the ith public key is signed using the jth private key in accordance with a signing rule, the jth private key being dissimilar to the ith private key belonging to the ith public key, and wherein all signing requests are transmitted to the same certification authority in each case, and each signing request is verified in the certification authority, in which case a check is performed to determine whether the ith signing request has been signed using the jth private key in accordance with the signing rule.

26 Claims, 4 Drawing Sheets

(56) References Cited

U.S. PATENT DOCUMENTS

| | | | |
|---|---|---|---|
| 2006/0168443 A1 | 7/2006 | Miller et al. | |
| 2008/0008316 A1* | 1/2008 | Pilipchuk | G06F 21/12 380/45 |
| 2012/0137129 A1* | 5/2012 | Busser | G06F 21/57 713/156 |
| 2013/0086377 A1* | 4/2013 | Cilfone | H04L 63/0823 713/156 |

OTHER PUBLICATIONS

MISPC Minimum Interoperability Specification for PKI Components, Version 2—Second Draft. NIST PKI Project Team, Aug. 31, 2000.

Nystrom, M. et al, PKCS #10: Certification Request Syntax Specification, Version 1.7, Nov. 2000.

* cited by examiner

METHOD AND SYSTEM FOR PROVIDING A PLURALITY OF TAMPERPROOF DIGITAL CERTIFICATES FOR A PLURALITY OF PUBLIC KEYS OF A DEVICE

BACKGROUND OF THE INVENTION

1. Field of the Invention

The invention relates to a method for providing a plurality of tamperproof digital certificates for a plurality of public keys of a device by a certification authority, and to a device, a certification authority, a system as well as a computer program and a data storage medium for implementing the method.

2. Description of the Related Art

In modern data networks, transmission security is usually based on the use of cryptographic methods, such as on encryption for ensuring confidentiality, or on keyed-hash message authentication codes (HMAC) or digital signatures for ensuring integrity protection and authenticity. Cryptographic parameters are required for each of these methods. For these methods, use is often made of asymmetrical methods in which different keys are respectively used for a transmitter and a receiver. In this case, a private key, which must be kept secret, is used to sign messages to be transmitted and to decrypt received messages, and a matching public key is used to verify received messages and to encrypt messages to be transmitted.

For this purpose, the public keys are usually published in the form of a digital certificate that binds the key to data relating to a user. Such a digital certificate is created by a trusted authority, such as a certification authority. Validity can be checked with the aid of the public key from the certification authority, which key was likewise published in the form of a certificate and was integrated, for example, in an operating system, a web browser or an application.

Key pairs and certificates for the end users can be produced directly by the certification authority, for example, and can then be distributed to the users and their devices. However, during this distribution, the private key must be reliably protected from unauthorized disclosure. In order to avoid exposing the private key to the risk of (possibly even unnoticed) disclosure during transport, the key pair can be locally produced in the user's device. Only the public key then needs to be transported to the certification authority, whereas the private key remains only in the device at all times. In contrast, certificates can be transported and distributed in any desired manner because they do not contain any confidential data and are reliably protected from any change via the certification authority's signature.

In order to transport the public key and the associated user data from the local production point to the certification authority, a signing request (also called certificate signing request (CSR)) has been developed as a special data format and has been defined as the cryptographic standard for public keys PKCS#10 and has been described in a standardization document RFC2986 from the Internet engineering task force (IETF). The signing request is "self-signed" by the creator using his private key. Upon receipt, however, the certification authority can therefore only check whether the creator possesses the private key matching the included public key. It is therefore not possible to check whether the user data included in the signing request are correct. Therefore, it is very important that signing requests are accepted by the certification authority only when they have been correctly created and authentically transmitted. If an attacker with his own, self-created signing request containing extraneous user data manages to obtain a certificate from the certification authority, he can feign a false identity with respect to other communication partners and, in the name of another user, can sign data and reach confidential data which were actually intended for another user.

WO 2012/016859 A1 describes an exemplary method and apparatus for the providing a tamperproof certificate, in which a certification authority provides a device with the certificate only if a signaling message received from the device is successfully verified using a one-time password. In this case, the one-time password is transmitted from the certification authority to the device in advance, for example to the user using a data storage medium. However, the disadvantage is that this method requires complicated distribution of the one-time password between the certification authority and the device.

It is often advantageous if, for a device having a plurality of applications, a different key pair is used for each application. For example, a first key pair can be used to encrypt and decrypt data and a second key pair can be used for signatures. The private key for decryption can then be stored in a backup database (recovery database) so that it can be recovered if lost and the user can access his encrypted data again. The private signature key need not and must not be stored in the recovery database. Instead, if lost, a new pair of signature keys is produced and is used to produce and check future signatures. Signatures that have already been previously produced can still be checked with the old public key.

The use of a plurality of key pairs for each device is sometimes also required by standards. For example, the technical guideline TR-03109 from the German Federal office for information security (Bundesamt für Sicherheit in der Informationstechnik (BSI)) requires that a future smart metering gateway must use one key pair for secure communication using the TLS protocol, a further key pair for signatures of the measurement data and a third key pair for end-to-end encryption of the transmitted data.

SUMMARY OF THE INVENTION

It is therefore an object of the invention to provide a simple method for requesting certificates, in particular for a plurality of public keys of a device, which manages without the distribution of additional parameters, such as one-time passwords, and additionally easily detects the tampering with signing request measures.

This and other objects and advantages in accordance with the invention are achieved by a method which provides a plurality of tamperproof digital certificates for a plurality of public keys of a device by a certification authority in which a respective signing request for requesting a digital certificate is initially created for each of a plurality of public keys. Here, the signing request for the ith public key is signed using the jth private key in accordance with a signing rule, the jth private key being dissimilar to the ith private key belonging to the ith public key. Next, all signing requests are transmitted to the same certification authority in each case, and each signing request is verified in the certification authority, in which case a check is performed in order to determine whether the ith signing request message has been signed using the jth private key in accordance with the signing rule.

As a result of the fact that the signing request for the ith public key is signed using a jth private key that does not belong to the ith public key, the certification authority can easily detect if one or more signing requests have been intercepted and have been replaced by an attacker with his signing request(s) that has/have been tampered with. In order to ensure this protection against tampering, there is no need to interchange or distribute additional passwords between the device and the certification authority.

It is particularly advantageous if a respective digital certificate for all of the plurality of public keys is issued, in an additional method step, only when all signing requests have been positively verified. A negatively verified signing request already indicates that one or more of the signing requests from this device have been tampered with. In this case, at least some or all of the signing requests from this device are rejected by the certification authority and further measures are initiated if necessary.

In one advantageous embodiment, the ith signing request is respectively signed cyclically or anticyclically or interchanged in another manner, for example, using the jth private key as the signing rule. As a result of this signing rule, all signing requests CSR_i from a device are coupled to one another and do not form any disjoint subgroups. This signing rule can be implemented in a few program lines. Therefore, the need for additional storage capacity in the device and in the certification authority as a result of the program being enlarged is negligibly low. A larger memory could possibly be required as a result of longer storage of request messages in the certification authority if the certification authority waits until all signing requests from a device are present and then checks them together. On account of a typically small size of the signing requests of only approximately 300 to 1000 bytes and a typical size of persistent data memories that are used nowadays of at least several hundred gigabytes, this additional requirement is likewise negligibly low. If the signing requests in the certification authority are additionally released for further processing only after being checked by a human user, they must also be stored for a correspondingly long time in accordance with the conventional method. Since only one signing request is locally created on the device for each requested certificate and is also signed there only once, and since only one signature is furthermore also checked by the certification authority for each signing request, the computational complexity for cryptographic operations is not increased in comparison with the conventional method with self-signed signing requests and there is no need to increase the processor load of the devices involved.

In another advantageous embodiment, the signing requests are each sent to the certification authority in a manner spaced apart from one another by a random waiting time. This makes it difficult for an attacker to suppress all signing request messages from a device that belong to one another and are coupled by the interchanged signatures and to replace them with forged signing requests with his own keys.

Another advantageous embodiment of the invention is achieved by ensuring that the signing requests are each sent to the certification authority on different communication paths. This also makes it difficult to intercept and tamper with the signing request messages. This is the case, in particular, when a plurality of transmission networks, such as a mobile radio network such as UMTS or a landline network with a digital subscriber connection (DSL) are available for redundancy reasons.

In a further advantageous embodiment, the certification authority transmits the requested certificates back to the device in a common message. This saves transmission bandwidth without jeopardizing security because the certificates are already protected against undesirable change by the certification authority's signature.

In an alternative embodiment, the certification authority transmits the requested certificates back to the device separately in a plurality of messages. If some of the certificates are damaged by erroneous transmission, for example, and are identified as invalid, it is sufficient to transmit only these certificates again.

In another embodiment, the number of signing requests transmitted by a single device is known to the certification authority and/or the number of signing requests is communicated to the certification authority. In the case of a number of signing requests that is the same for each device in the overall system in particular, the number of signing requests can be permanently predefined in a certification authority responsible for these devices, with the result that the signing requests can then be transmitted to the certification authority without further parameters. Alternatively, the number of signing requests is transmitted to the certification authority in at least one signing request from the device. As a result of the fact that the number of signing requests is communicated in at least one signing request, a certification authority can issue a different number of certificates for devices on request and can therefore be flexibly used for different types of devices.

In another embodiment, the signing rule used is known to the certification authority and/or is communicated to the certification authority.

In another advantageous embodiment, the number of signing requests and/or the signing rule is/are transmitted to the certification authority in at least one signing request message from the device.

In another advantageous embodiment, the certification authority triggers an alarm if at least one signing request has not been positively verified. The alarm can be used to alert the certification authority and/or further entities, such as the device or else a superordinate control unit, to possible tampering with the signing requests. Corresponding measures can then be taken in an automated manner, such as the production of an entry in a log file, the temporary or permanent blocking of network connections and functions such as certificate creation, and/or the direct alerting of a human operator using email, SMS, IMS or a similar service.

In another embodiment, issue of at least the associated digital certificate is refused by the certification authority in the event of a negatively verified signing request. This allows certificates to be issued for the transmitting device despite negative verification and enables at least partially secure operation for this device.

In another embodiment of the present invention, the certification authority refuses the issue of all digital certificates for the transmitting device if at least one signing request has been negatively verified. Tampering with a signing request already indicates activities of an active attacker and it is perhaps not possible to decide which of the received signing requests has been tampered with. As a result, unjustified issue of a certificate for signing requests which have possibly been tampered with can therefore be categorically avoided.

It is also an object of the invention to provide a device for the providing tamperproof digital certificates for a plurality of public keys, comprising a storage unit which is configured to store a plurality of key pairs each with a public key and an associated private key, a requesting unit which is configured to respectively create a signing request for requesting a digital certificate for each of a plurality of public keys and to sign signing requests for the ith public key using the jth private key according to a signing rule, where the jth private key is dissimilar to the ith private key belonging to the ith public key. The device also comprises a transmitting unit which is configured to transmit all signing requests to the same certification authority.

It is a further object of the invention to provide a certification authority for providing a plurality of tamperproof digital certificates for a plurality of public keys of a device, having a receiving unit, a storage unit, and a certification unit. The receiving unit is configured to respectively receive a signing request for requesting a digital certificate for each of a plurality of public keys from a device. The storage unit is configured to store at least one signing rule, the signing rule indicating that a signing request for an ith public key is signed using the jth private key, the jth private key being dissimilar to the ith private key belonging to the ith public key. The certification unit is configured to check a signing request to determine whether it has been signed in accordance with the signing rule.

In one advantageous embodiment, the certification authority also comprises an issuing unit which is configured to respectively issue a digital certificate for all of the plurality of public keys if all signing requests have been positively verified.

It is also a further object of the present invention to provide a system for providing a plurality of digital certificates for a plurality of public keys of a device, comprising at least one device in accordance with the invention and a certification authority according to the invention.

A computer program having program instructions for carrying out the method according to the invention and a data storage medium which stores the computer program are also disclosed.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Exemplary embodiments of the method in accordance with the invention and of the device in accordance with the invention, of the certification authority in accordance with the invention and of the system in accordance with the invention are illustrated by way of example in the drawings and are explained in more detail using the following description, in which.

DETAILED DESCRIPTION OF THE PREFERRED EMBODIMENTS

All of the features described and/or depicted can be advantageously combined with one another within the scope of the invention. The invention is not restricted to the exemplary embodiments described.

Key pairs of a device may be produced in a secure environment, such as within the device itself. In order to obtain a certificate signed by a certification authority for a plurality of public keys, in particular, a signing request is created in the device for each public key and is transmitted to the same certification authority in each case.

In the previously conventional methods, a signing request is self-signed, that is to say is signed using the private key Kpriv_1 belonging to the public key Kpub_1.

In particular, when transmitting such a signing request CSR_1 via a non-secure network, such as the Internet, a signing request may possibly be suppressed and replaced with a forged signing request containing the attacker's public key. The latter could then obtain a certificate containing the user data relating to the device from the certification authority and could then impersonate this device in the network.

In order to detect and avoid such tampering, when a plurality of certificates CERT_1, . . . , CERT_M are requested for a plurality of public keys Kpub_1, . . . , Kpub_M for a device from the same certification authority in each case, an ith signing request CSR_i for the public key Kpub_i is now signed, in accordance with the invention, using a private key Kpriv_j belonging to a public key Kpub_j which is dissimilar to Kpub_i.

Figure 1:
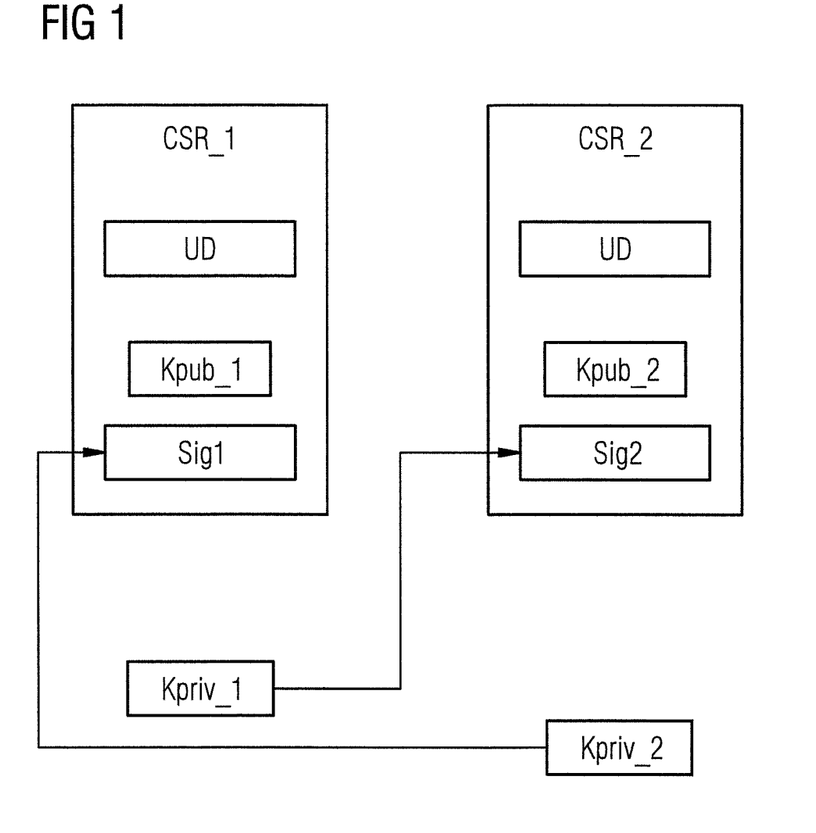
FIG. 1 shows a schematic illustration of a first exemplary embodiment with two signing requests according to the method in accordance with the invention.

Two corresponding signing requests CSR_1, CSR_2 are illustrated in FIG. 1. Both signing requests are created in a device and are transmitted to a certification authority that is the same certification authority for both certificates in each case. Both signing requests CSR_1, CSR_2 each contain user data UD which comprise, for example, an identifier of the device and further details, such as the organization or manufacturer of the device, or else further details characterizing the device. The signing request CSR_1 comprises the public key Kpub_1, for which a certificate CERT_1 is requested, and is signed using the private key Kpriv_2 that belongs to the public key Kpub_2. The signing request CSR_2 comprises the public key Kpub_2, for which a certificate CERT_2 is requested, and is signed using the private key Kpriv_1 that belongs to the public key Kpub_1.

If a plurality of, but not all of, the signing requests CSR_1, . . . , CSR_M are intercepted and are replaced by an attacker with his signing requests which have been tampered with, this can be easily detected by the certification authority and an alarm can be triggered.

Figure 2:
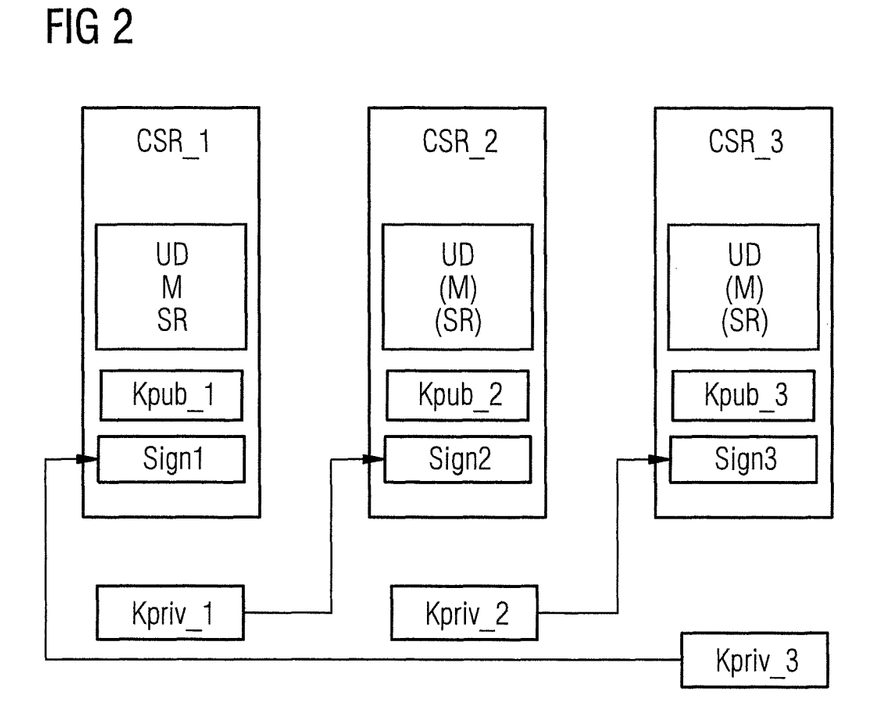
FIG. 2 shows a schematic illustration of a second exemplary embodiment with three signing requests according to the method in accordance with the invention.

FIG. 2 illustrates cyclically interchanged signing for three signing requests CSR_1, CSR_2, CSR_3. In this case, for example, the second signing request CSR_2 for the public key Kpub_2 is signed using the private key Kpriv_1 that belongs to the public key Kpub_1. The third signing request CSR_3 for the public key Kpub_3 is signed using the private key Kpriv_2 which belongs to the public key Kpub_2. Finally, the first signing request CSR_1 for the public key Kpub_1 is signed using the private key Kpriv_3 which belongs to the public key Kpub_3.

As already described above, the signing request CSR_j for the public key Kpub_j is respectively intended to be signed using a private key Kpriv_i which belongs to another public key Kpub_i, that is to say i is dissimilar to j, in order to couple the signing requests to one another. In the case of two signing requests, only one interchange is possible, i.e., Kpriv_1 signs CSR_2 and Kpriv_2 signs CSR_1, and therefore also only one signing rule. In the case of three signing requests, there are two possible interchange rules in which each private key Kpriv_i signs the signing request CSR_j of precisely one other public key Kpub_j, namely a cyclical interchange, i.e., Kpriv_1 signs CSR_2, Kpriv_2 signs CSR_3 and Kpriv_3 signs CSR_1, as well as an anticyclical interchange, Kpriv_1 signs CSR_3, Kpriv_3 signs CSR_2 and Kpriv_2 signs CSR_1. It is additionally also possible to sign a plurality of signing requests CSR_j for other public keys Kpub_j using one private key Kpriv_i, for example, Kpriv_1 signs the signing request CSR_2 and the signing request CSR_3, Kpriv_2 signs the signing request CSR_1, and Kpriv_3 does not sign a signing request because all signing requests have already been signed with private keys other than Kpriv_3. All signing requests are also coupled to one another in this case.

In the case of four or more signing requests, interchanges with disjoint subgroups are also possible, for example, Kpriv_1 signs the signing request CSR_2, Kpriv_2 signs the signing request CSR_1, Kpriv_3 signs the signing request CSR_4 and Kpriv_4 signs the signing request CSR_3. However, the use of such interchanges with disjoint subgroups has the disadvantage that the signing requests of different subgroups are no longer coupled to one another and the certification authority can then no longer determine tampering has occurred if an attacker manages to replace all signing requests of a disjoint subgroup with his own signing requests. Therefore, it is advantageous to use, in particular, signing rules with those interchanges that do not form any disjoint subgroups.

Irrespective of the above exemplary embodiment, the signing requests CSR_i may contain, in addition to the user data UD, details of the number M of signing requests transmitted by a device to the certification authority with interchanging of the signature. In addition, a signing rule SR may be included in a signing request message and may thus be transmitted to the certification authority and thus disclosed to the latter. The number of signing requests M coupled in this manner and the signing rule SR are included in at least one signing request message in this case. However, they may also be included in each signing request message.

Figure 3:
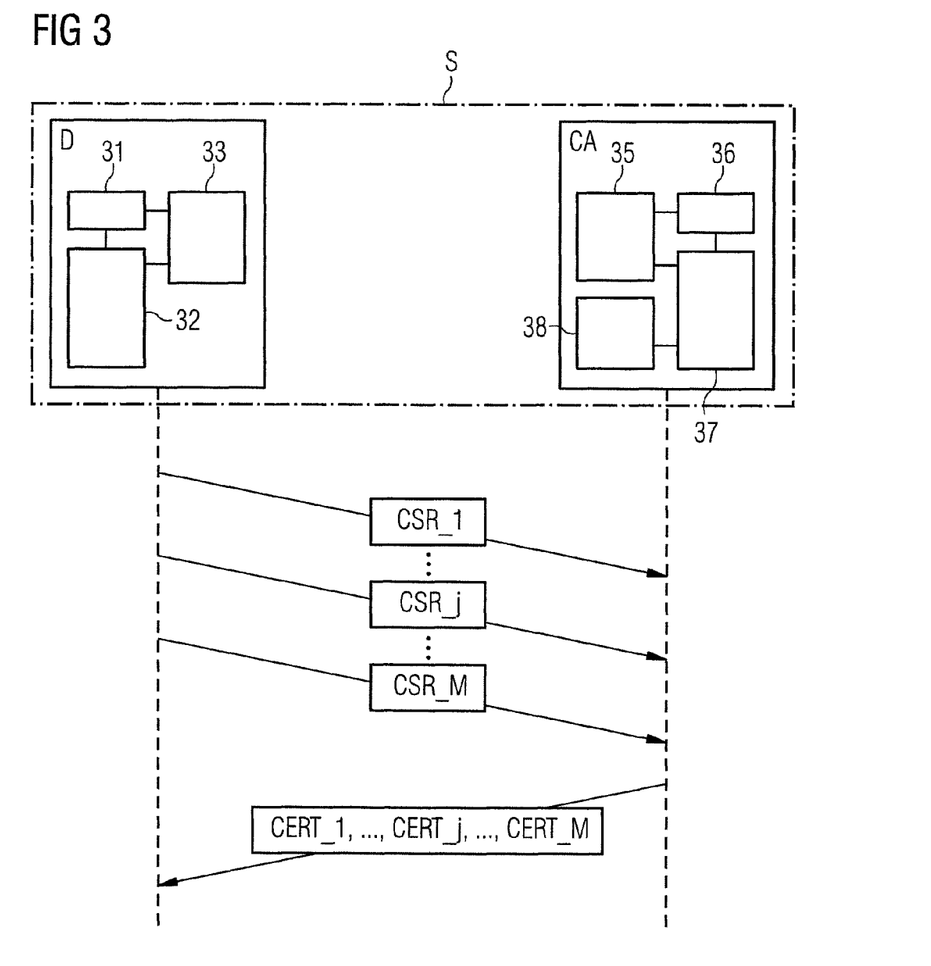
FIG. 3 shows a schematic illustration of an exemplary embodiment of a system in accordance with the invention and an exemplary embodiment of the message flow.

FIG. 3 illustrates an exemplary message flow between a device D and a certification authority CA. In this example, a number M of signing requests CSR_1, . . . , CSR_M is created by a device D for M key pairs for requesting a certificate for the respective public key Kpub_1 to Kpub_M. In this case, each signing request CSR_i for the ith public key Kpub_i is signed using the jth private key Kpriv_j in accordance with a signing rule SR, the jth private key Kpriv_j being dissimilar to the private key Kpriv_i belonging to the ith public key Kpub_i (see examples from FIGS. 1 and 2). After creation, the signing requests CSR_1, . . . , CSR_M are then transmitted in any desired order to the certification authority CA in individual messages, random waiting times between the messages being complied with, for example. It is advantageous if the signing requests CSR_1, . . . , CSR_M are each sent to the certification authority CA on different communication paths, in particular if a plurality of communication paths, such as via a mobile radio network or a fixed data network, are available, for example, for redundancy reasons.

When all signing requests CSR_1, . . . , CSR_M have arrived at the certification authority CA, the latter does not check the signing requests CSR_1, . . . , CSR_M to determine whether they have been self-signed but rather to determine whether they have been signed in interchanged form in accordance with the invention in the expected manner in accordance with the signing rule SR.

The number M of signing requests CSR_1, . . . , CSR_M to be expected from a new device D is known to the certification authority CA either by presetting or by a notification from a signing management authority, for example. The same applies to the signing rules SR used in the device D. These are likewise known to the certification authority CA. Alternatively, as shown in FIG. 2, the number M and the signing rule SR of the coupled signing requests CSR_1, . . . , CSR_M may be included in at least one signing request and may be read and used by the certification authority. In this case, it is important for the information relating to the number M and relating to the signing rule SR to be associated with an identifier of the transmitting device D, which identifier is contained in the user data UD, for example.

If all of the checks in the certification authority CA are successful, i.e., if all signing requests CSR_1, . . . , CSR_M are positively verified, the certification authority CA respectively issues a digital certificate CERT_1, CERT_M for all of the plurality of public keys Kpub_1, . . . , Kpub_M. The certificates CERT_1, . . . , CERT_M can be transmitted to the creator of the signing requests CSR_1, . . . , CSR_M either together or separately. Instead of being returned to the device or in addition thereto, the certificates can also be held in a publicly accessible storage area and can be made available to the device or third parties upon request. For the sake of clarity, FIG. 3 illustrates only the joint transmission of the certificates in one message.

If at least one signature of a signing request CSR_j does not match the signing rule SR and is therefore negatively verified, the certification authority CA refuses at least issue of the associated digital certificate CERT_ j. However, it is advantageous that the certification authority CA refuses the issue of all digital certificates CERT_1, . . . , CERT_M if at least one signing request CSR_j has been negatively verified.

In the event of negative verification, the certification authority CA can trigger an alarm and can therefore alert the transmitting device D, but also further devices which would like to request certificates from the certification authority and are connected to the certification authority via the same data network, for example, or a human operator. The requesting and/or creation of certificates can be prevented for the duration of the alarm or delayed until the alarm is actively switched off.

The upper part of FIG. 3 illustrates a system S in accordance with the invention by way of example. Said system comprises a certification authority CA and a device D which are connected to one another by one or more data transmission networks (not illustrated).

The device D comprises a storage unit 31, a requesting unit 32 and a transmitting unit 33 that are each connected to one another. The transmitting unit 33 additionally comprises an interface (not illustrated) for transmitting signing requests CSR_1, . . . , CSR_M to the certification authority CA. The storage unit 31 is configured to store a plurality of key pairs K_1, . . . , K_N each having a public key Kpub_1, . . . , Kpub_N and an associated private key Kpriv_1, . . . , Kpriv_N. The device D may request certificates CERT_1, . . . , CERT_M either for all public keys Kpub_1, . . . , Kpub_N or else for a subset M, where M must be greater than 1, however, from the same certification authority CA in each case.

A signing request CSR_1, ..., CSR_M for requesting a digital certificate for each of a plurality of public keys Kpub_1, ..., Kpub_M is respectively created in the requesting unit 32, a signing request CSR_i being signed in accordance with the signing rule SR. These signing requests CSR_1, ..., CSR_M are forwarded to the transmitting unit 33 which is configured, in this case, such that all signing requests CSR_1, ..., CSR_M are transmitted to the same certification authority in each case in a manner spaced apart by a random waiting time, for example. However, different interfaces to different transmission networks may be used in this case to transmit the different signing requests CSR_1, ..., CSR_M.

The certification authority CA comprises a receiving unit 35 that is connected to a storage unit 36 and to a certification unit 37. The certification unit 37 is connected to the storage unit 36 and to the issuing unit 38. In this case, the receiving unit 35 is configured such that it can receive signing requests CSR_1, ..., CSR_M from a device D.

The storage unit 36 stores at least one signing rule SR for signing requests CSR_1, ..., CSR_M from a predetermined device D as well as a number M of coupled signing requests CSR_1, ..., CSR_M that have already been received from a device D for requesting certificates CERT_1, ..., CERT_M for the public keys Kpub_1, ..., Kpub_M. In addition, the number M of signing requests to be coupled can be stored there.

The certification unit 37 comprises a device, such as a processor, in order to check the signing requests CSR_1, ..., CSR_M to determine whether they have been signed in accordance with the signing rule SR. The certification unit 37 also comprises means for activating an alarm, such as for generating and forwarding a notification which is transmitted to the transmitting device D or else to further devices or a central notification authority.

The issuing unit 38 is configured to issue a respective digital certificate CERT_1, ..., CERT_M for all public keys Kpub_1, ..., Kpub_M if all signing requests CSR_1, ..., CSR_M have been positively verified and it is informed of this by the certification unit 37. The issuing unit 38 likewise comprises one or else more interfaces to a data transmission network via which it transmits the issued certificates CERT_1, ..., CERT_M back to the device either together or separately or deposits them in a publicly accessible repository, such as a server.

Figure 4:
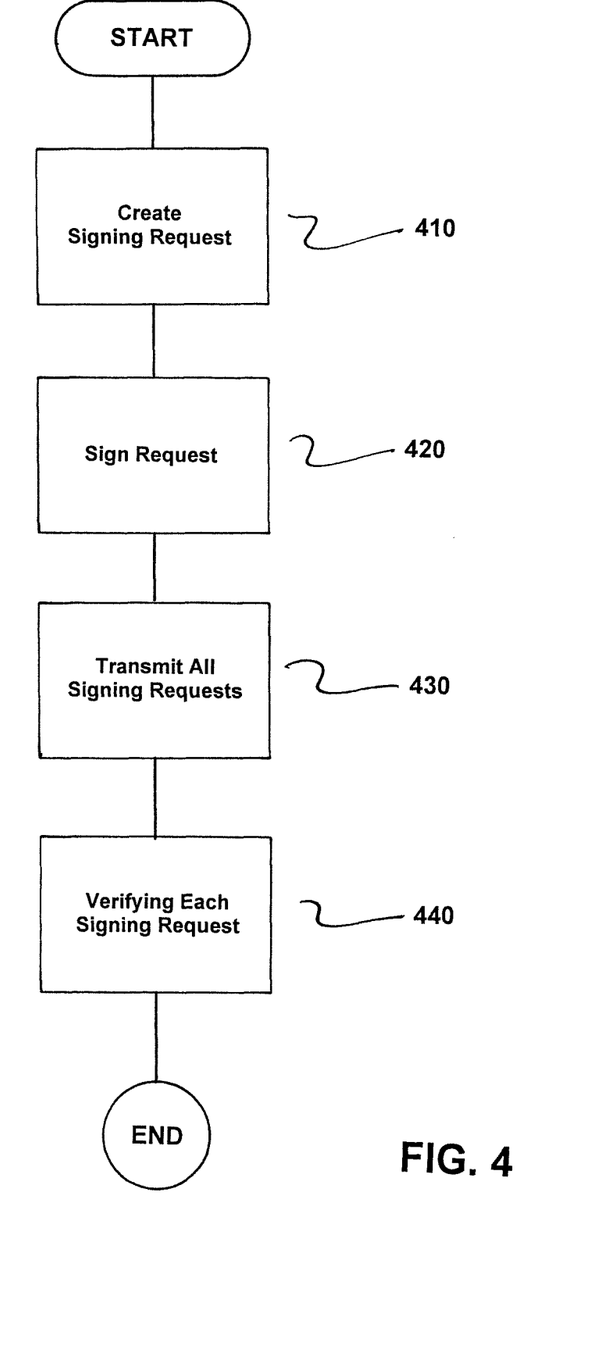
FIG. 4 is a flowchart of the method in accordance with the invention.

FIG. 4 is a flowchart of the method in accordance with the invention. for providing a plurality of tamperproof digital certificates for a plurality of public keys (Kpub_1, ..., Kpub_M) of a device (D) by a certification authority (CA). The method comprise creating a respective signing request (CSR_1, ..., CSR_M) for requesting a digital certificate (CERT_1, ..., CERT_M) for each of a plurality of public keys (Kpub_1, ..., Kpub_M), as indicated in step 410.

Next, the signing request (CSR_i) is signed for the ith public key (Kpub_i) using the jth private key (Kpriv_j) for all M public keys (Kpub_1, ..., Kpub_M) in accordance with a signing rule (SR), as indicated in step 420. Here, the jth private key (Kpriv_j) is dissimilar to the ith private key (Kpriv_i) belonging to the ith public key (Kpub_i).

Next, all signing requests are transmitted to the same certification authority (CA) in each case, as indicated in step 430. Each signing request (CSR_1, ..., CSR_M) is then verified in the certification authority (CA), in which case a check is performed to determine whether each signing request has been signed in accordance with the signing rule (SR), as indicated in step 440.

All of the features described and/or depicted can be advantageously combined with one another within the scope of the invention. The invention is not restricted to the exemplary embodiments described.

While there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for providing a plurality of tamperproof digital certificates for a plurality of public keys of a device by a certification authority, comprising:
   creating a respective signing request for requesting a digital certificate for each of a plurality of public keys;
   signing the signing request for the ith public key using the jth private key for all M public keys in accordance with a signing rule, the jth private key being dissimilar to the ith private key belonging to the ith public key;
   transmitting all signing requests to the same certification authority in each case;
   verifying each signing request in the certification authority, in which case a check is performed to determine whether each signing request has been signed in accordance with the signing rule; and
   issuing a respective digital certificate for all of the plurality of public keys if all signing requests have been positively verified.

2. The method as claimed in claim 1, wherein the ith signing request is respectively signed cyclically, anticyclically or interchanged in another manner using the jth private key as the signing rule.

3. The method as claimed in claim 1, wherein the signing requests are each sent to the certification authority in a manner spaced apart from one another by a random waiting time.

4. The method as claimed in claim 1, wherein the signing requests are each sent to the certification authority on different communication paths.

5. The method as claimed in claim 1, wherein the certification authority transmits the requested certificates to the device in a common message.

6. The method as claimed in claim 1, wherein the certification authority transmits the requested certificates to the device separately in a plurality of messages.

7. The method as claimed in claim 1, wherein a number of signing requests transmitted by a single device is at least one of (i) known to the certification authority and (ii) communicated to the certification authority.

8. The method as claimed in claim 1, wherein the signing rule utilized is at least one of (i) known to the certification authority and (ii) communicated to the certification authority.

9. The method as claimed in claim 7, wherein at least one of (i) a number of signing requests and (ii) the signing rule is transmitted to the certification authority in at least one of the signing requests from the device.

10. The method as claimed in claim 7, wherein at least one of (i) a number of signing requests and (ii) the signing rule is transmitted to the certification authority in at least one of the signing requests from the device.

11. The method as claimed in claim 1, wherein the certification authority triggers an alarm if at least one signing request is not positively verified.

12. The method as claimed in claim 1, wherein issue of at least the associated digital certificate is refused by the certification authority in an event of a negatively verified signing request.

13. The method as claimed in claim 1, wherein the certification authority refuses the issue of all digital certificates if at least one signing request is negatively verified.

14. A device for providing a plurality of tamperproof digital certificates for a plurality of public keys, comprising:
  a storage unit configured to store a plurality of key pairs each with a public key and an associated private key;
  a requesting unit configured to respectively create a signing request for requesting a digital certificate for each of a plurality of public keys and to sign a signing request for the ith public key using a jth private key for all public keys in accordance with a signing rule, the jth private key being dissimilar to an ith private key belonging to an ith public key; and
  a transmitting unit configured to transmit all signing requests to the same certification authority in each case;
  wherein a respective digital certificate for all of the plurality of public keys is received by the device if all signing requests have been positively verified.

15. The device as claimed in claim 12, wherein, via the storage unit, the requesting unit and the transmitting unit, the ith signing request is respectively signed cyclically, anticyclically or interchanged in another manner using the jth private key as the signing rule.

16. The device as claimed in claim 1, wherein, via the storage unit, the requesting unit and the transmitting unit, the signing requests are each sent to the certification authority in a manner spaced apart from one another by a random waiting time.

17. The device as claimed in claim 1, wherein the signing requests are each sent to the certification authority on different communication paths.

18. The device as claimed in claim 1, wherein, via the storage unit, the requesting unit and the transmitting unit, the certification authority transmits the requested certificates to the device in a common message.

19. The device as claimed in claim 1, wherein, via the storage unit, the requesting unit and the transmitting unit, the certification authority transmits the requested certificates to the device separately in a plurality of messages.

20. The device as claimed in claim 1, wherein, via the storage unit, the requesting unit and the transmitting unit, a number of signing requests transmitted by a single device is at least one of (i) known to the certification authority and (ii) communicated to the certification authority.

21. The device as claimed in claim 1, wherein, via the storage unit, the requesting unit and the transmitting unit, the signing rule utilized is at least one of (i) known to the certification authority and (ii) communicated to the certification authority.

22. The device as claimed in claim 20, wherein at least one of (i) a number of signing requests and (ii) the signing rule is transmitted to the certification authority in at least one of the signing requests from the device.

23. A certification authority for providing a plurality of tamperproof digital certificates for a plurality of public keys of a device, comprising:
  a receiving unit configured to respectively receive a signing request for requesting a digital certificate for each of a plurality of public keys from a device;
  a storage unit configured to store at least one signing rule, the signing rule indicating that a signing request for an ith public key is signed using a jth private key for all M public keys, the jth private key being dissimilar to the ith private key belonging to the ith public key;
  a certification unit configured to check a signing request message to determine whether it has been signed in accordance with the signing rule; and
  an issuing unit configured to respectively issue a digital certificate for all of the plurality of public keys if all signing request messages are positively verified.

24. The certification authority as claimed in claim 16, wherein, via the receiving unit, the storage unit, the certification unit and the issuing unit, a respective digital certificate is issued for all of the plurality of public keys if all signing requests have been positively verified.

25. The certification authority as claimed in claim 17, wherein, via the receiving unit, the storage unit, the certification unit and the issuing unit, a respective digital certificate is issued for all of the plurality of public keys if all signing requests have been positively verified.

26. A system for providing a plurality of digital certificates for a plurality of public keys of a device, the system comprising:
  a device for providing a tamperproof plurality of digital certificates for a plurality of public keys, the device comprising:
    a storage unit configured to store a plurality of key pairs each with a public key and an associated private key;
    a requesting unit configured to respectively create a signing request for requesting a digital certificate for each of a plurality of public keys and to sign a signing request for the ith public key using a jth private key for all M public keys in accordance with a signing rule, the jth private key being dissimilar to an ith private key belonging to an ith public key; and
    a transmitting unit configured to transmit all signing requests to the same certification authority in each case; and
  a certification authority for providing the plurality of tamperproof digital certificates for the plurality of public keys of the device, the certification authority comprising:
    a receiving unit configured to respectively receive the signing request for requesting the digital certificate for each of the plurality of public keys from the device;
    a storage unit configured to store at least one signing rule, the signing rule indicating that a signing request for an ith public key is signed using a jth private key for all M public keys, the jth private key being dissimilar to the ith private key belonging to the ith public key;
    a certification unit configured to check a signing request message to determine whether it has been signed in accordance with the signing rule; and an issuing unit configured to respectively issue a digital certificate for all of the plurality of public keys if all signing request messages are positively verified.

* * * * *